(12) United States Patent
Ho

(10) Patent No.: US 7,592,770 B2
(45) Date of Patent: Sep. 22, 2009

(54) PARKING CONTROL TECHNIQUE FOR PERMANENT MAGNET MOTOR DRIVES WITH SINUSOIDAL BEMF

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/770,047

(22) Filed: Jun. 28, 2007

(65) Prior Publication Data
US 2008/0042612 A1    Feb. 21, 2008

Related U.S. Application Data

(60) Provisional application No. 60/817,280, filed on Jun. 29, 2006.

(51) Int. Cl.
*H02P 3/18* (2006.01)
(52) U.S. Cl. .................... 318/721; 318/432; 318/434; 318/685; 318/400.02
(58) Field of Classification Search ............... 318/721, 318/432, 434, 685, 400.02
See application file for complete search history.

(56) References Cited

U.S. PATENT DOCUMENTS 5,208,523 A * 5/1993 Harman .................. 318/685

* cited by examiner

*Primary Examiner*—Bentsu Ro
*Assistant Examiner*—Erick Glass
(74) *Attorney, Agent, or Firm*—Farajami & Farajami LLP

(57) ABSTRACT

A method and system for controlling a current regulator motor control for parking a motor rotor in a predetermined position, wherein a first current command and a first angle command are supplied to a current regulator for a first parking time, to move the rotor to an intermediate position; and a second current command and a second angle command are supplied to the current regulator for a second parking time, to move the rotor to a predetermined position. The current regulator may have a normal voltage output range, and a circuit may be provided for limiting a voltage output of the current regulator to a reduced voltage output range for at least a portion of the parking time. Advantageously the motor is a permanent-magnet synchronous motor with sinusoidal back-EMF.

6 Claims, 2 Drawing Sheets

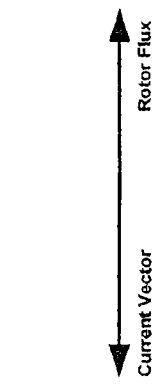
Fig. 1a
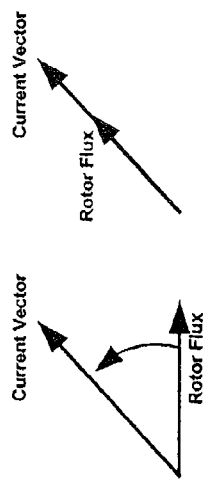
Fig. 1b
Fig. 1c
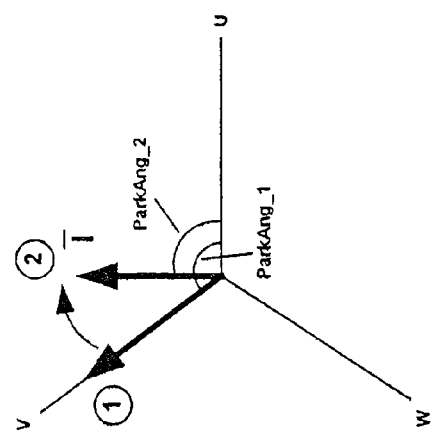
Fig. 2b
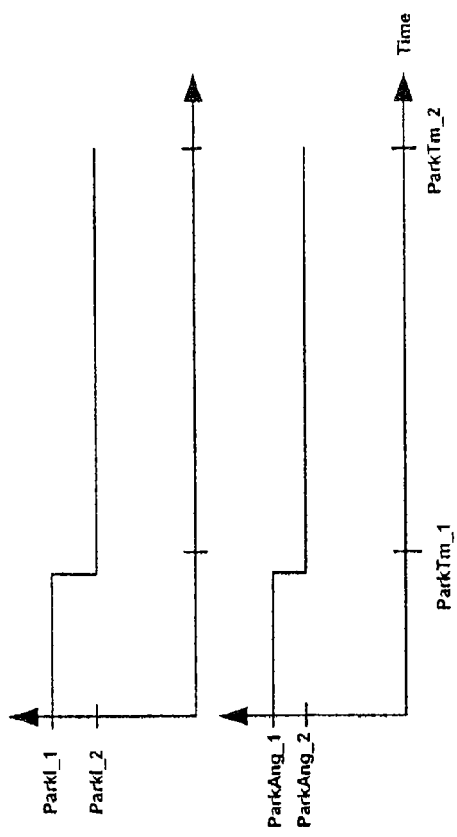
Fig. 2a

PARKING CONTROL TECHNIQUE FOR PERMANENT MAGNET MOTOR DRIVES WITH SINUSOIDAL BEMF

BACKGROUND OF THE INVENTION

The present invention relates to a parking control technique, particularly for permanent magnet motor devices with sinusoidal BEMF, and more particularly to a technique employing two stages of dc current injection.

In order to achieve maximum torque per ampere for a sensorless (no rotor angle feedback) PMSM (permanent magnet synchronous motor) with sinusoidal BEMF, and not for example with trapezoidal BEMF, the angle relationship between inverter-applied current and rotor magnetic flux are enforced to a prescribed trajectory.

The initial rotor angle of a sensorless PMSM drive can be obtained by magnetic saturation detection through the use of signal injection or by forcing the motor shaft to a known position using dc current injection. The latter method allows very simple algorithms and implementations especially with current regulated drives. However, its usage is limited to applications where momentary backward shaft movement is allowed during startup. In addition, there are situations where position detection failure occurs with this dc injection scheme.

SUMMARY OF THE INVENTION

The invention relates to the implementation of a motor control algorithm, which avoids these drawbacks and allows maximum torque per ampere capability at initial starting of a Permanent Magnet Synchronous (PMSM) Motor.

The disclosed embodiment of the invention carries out a two-stage dc current injection into the motor windings, preferably via a synchronously rotating reference frame current regulator. Each stage of dc current injection commands a current magnitude and an angle for a prescribed time duration. Current regulator output limits can be manipulated during dc current injection in order to reduce rotor shaft hunting when large inertia loads are employed.

The implementation of the simple two-stage dc current injection scheme improves the robustness of the dc current injection technique. The scheme may be advantageously applied to a current regulated Field-Oriented Permanent Magnet motor drive having Sinusoidal Back EMF waveform.

Disclosed are a method and system for controlling a current regulator motor control for parking a motor rotor in a predetermined position, wherein a first current command and a first angle command are supplied to a current regulator for a first parking time, to move the rotor to an intermediate position; and a second current command and a second angle command are supplied to the current regulator for a second parking time, to move the rotor to a predetermined position. The current regulator may have a normal voltage output range, and a circuit may be provided for limiting a voltage output of the current regulator to a reduced voltage output range for at least a portion of the parking time. Advantageously the motor is a permanent-magnet synchronous motor with sinusoidal back-EMF.

Other features and advantages of the present invention will become apparent from the following description of an embodiment of the invention which refers to the accompanying drawings.

BRIEF DESCRIPTION OF THE DRAWINGS

FIGS. 1a-1c schematically illustrate examples of initial startup conditions.

FIGS. 2a and 2b are a graph and a vector diagram illustrating a two-stage current injection scheme.

DETAILED DESCRIPTION OF AN EMBODIMENT OF THE INVENTION

Figure 3:
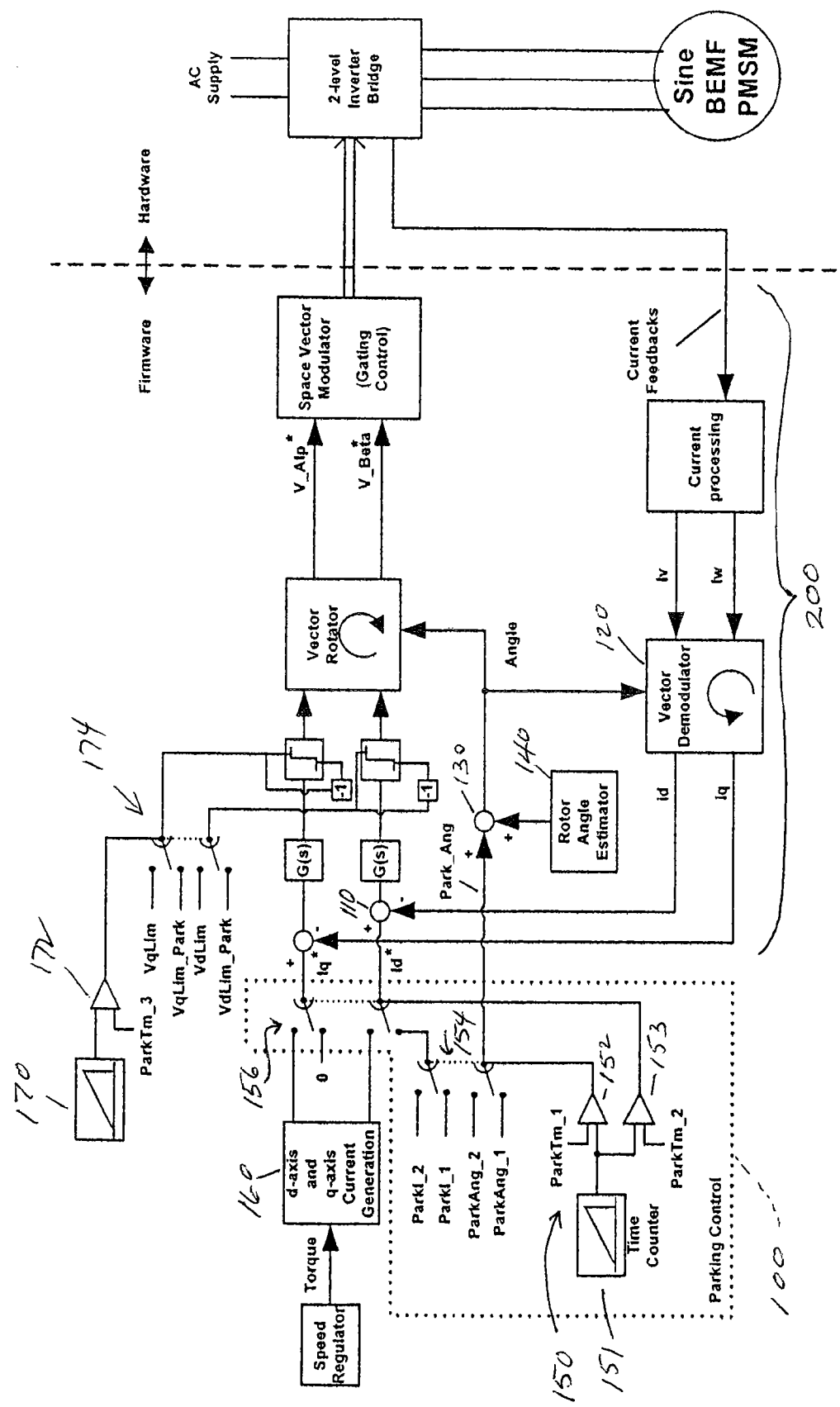
FIG. 3 is a schematic block diagram showing a drive system carrying out a two-stage dc current injection scheme via synchronously rotating reference frame current regulator.

During initial inverter startup, a dc current is impressed in the stator winding. Since the initial rotor position is unknown, the relative position between the rotor and the current vector is arbitrary. In most cases, the rotor will pull towards the current vector and form alignment as shown in FIGS. 1a and 1b. However, there are situations where the rotor flux is 180 degrees out of phase with the applied current vector (FIG. 1c). This condition will cause a failure in flux current alignment.

In order to avoid the condition shown in FIG. 1c, the dc injection is applied to the motor in two stages as shown in FIGS. 2a and 2b. In the first stage, a current vector (vector "1" in FIG. 2b) is applied with configurable amplitude (ParkI_1) and angle (ParkAng_1). In the second stage, a second current vector (vector "2" in FIG. 2b) is applied also with configurable amplitude (ParkI_2) and angle (ParkAng_2). The amplitudes and angles are predetermined for each application. For instance, in this example, the stage 1 dc current injection angle is 120 degrees (ParkAng_1) and the stage 2 angle is 90 degrees (ParkAng_2).

When the motor current is forced into the motor winding, the rotor (rotor magnet) position will align in accordance with the current vector due to the pulling of reluctance torque (as seen for example in FIGS. 1a-1b). For example, if the forced current vector is 90 degrees with respect to the motor winding, the rotor will try to align at an that angle of 90 degrees to the motor winding. Thus, the rotor will be placed in a known position, so that its position will no longer be random or unknown.

In this embodiment of the invention, the 120 degree angle and the 90 degree angle are with respect to the U phase of the motor winding. Since the U phase winding has a known position, the steps of this example of the invention will place the rotor in a known position as desired.

Thus, the use of the two stages enables misalignment of magnetic polarity to be avoided. Since both current amplitude and angle are configurable in both parking stages, the effectiveness of pulling the rotor to the prescribed initial current vector position is improved.

The implementation of the two-stage dc current injection scheme via a synchronously rotating reference frame current regulator is shown in FIG. 3. The parking control portion 100 (two-stage dc current injection with amplitude and angle control) interfaces to the synchronous rotating reference frame current regulator 200 via a d-axis current command (id*) and an angle command (Park_Ang). The d-axis current command id* is added by summer 110 to the d-axis current signal id from the vector demodulator 120. The parking angle command Park_Ang is added by summer 130 to the angle signal from the rotor angle estimator 140. For Field-Oriented Control purposes, it is assumed that the rotor angle (rotor flux) aligns with the d-axis. Therefore d-axis current command is used for dc current injection.

The total parking duration is ParkTm_2. The parking time is controlled by a time counter arrangement 150 in which a ramp signal from time counter 151 is compared by a pair of comparators 152 and 153 against a pair of predetermined input signals which respectively correspond to ParkTm_1 and ParkTm_2.

The comparator 152 controls a switch 154 which selects between predetermined current setting inputs ParkI_1 and ParkI_2 to be supplied as id* to the summer 110. The switch 154 also selects which of predetermined angle setting inputs ParkAng_1 and ParkAng_2 will be supplied to the summer 130.

The comparator 153 controls a second switch 156 which selects whether the d-axis current command id* is obtained from the parking control 100 or from the command generator 160. The second switch 156 also controls the supply of the q-axis current command iq* from the generator 160.

The amount of parking time is application dependent and is predetermined for each application. Normally, the higher the motor inertia to friction ratio the longer the parking time.

Due to dc injection flux, the rotor will be pulled to a known position specified by the second current vector (FIG. 1b). Therefore, as soon as parking finishes, the actual rotor position is aligned with the d-axis. The current commands (Id* and Iq*) are then switched by the second switch 156 to the field-oriented d-q current generator 160 for maximum torque per ampere control.

During the parking stage, the output limit of the current regulator can be restricted by VdLim_Park and VqLim_Park (configurable) for a partial duration (controlled by ParkTm_3) of the parking stage. This can be done to reduce rotor shaft hunting when high shaft inertia load is employed.

These limits can be determined according to the estimated voltage demand of the motor during parking, which is usually less than 10-15 percent of the motor rated voltage, depending on the resistance and inductance of the particular motor.

Provided for this purpose are a second time counter 170, a third comparator 172 which receives a predetermined time signal ParkTm_3, and a third switch 174 which selects between the output limits VqLim and VdLim, and the parking stage output limits VqLim_Park and VdLim_Park.

For example, if ParkTm_3 is configured for 70% of the entire parking duration (ParkTm_3=0.7*(ParkTm_1+ParkTm_2), then for the first 70% of the parking duration, the current regulators will have limited output (VqLim>VqLim_Park, VdLim>VdLim_Park), and full output for the rest of the parking duration in which the rotor can be held tightly in the desired position.

Parameter Definitions

ParkI_1, ParkI_2—Current amplitude of dc current injection stage 1 and 2.
ParkAng_1, ParkAng_2—Current angle of dc current injection stage 1 and 2.
ParkTm_1, ParkTm_2—Parking time of stage 1 and 2.
Id*, Iq*—command d-axis and q-axis current.
id, iq—d-axis (align with rotor magnet) current and q-axis feedback current.
Iv, Iw—V and W phase motor current feedback.
V_Alp*, V_Beta*—Alpha-Beta modulation index.
ParkTm_3—Duration of current limit during parking.
VdLim, VqLim—current regulator output limit.
VdLim_Park, VqLim_Park—current regulator output limit during initial parking.

Although the present invention has been described in relation to particular embodiments thereof, many other variations and modifications and other uses will become apparent to those skilled in the art. Therefore, the present invention is not limited by the specific disclosure herein.

What is claimed is:

1. A method of controlling a current regulator motor control for moving a motor rotor from an arbitrary initial position in which rotor flux is 180 degrees out of phase with applied current, to park said rotor in a predetermined final position, comprising the steps of:
   supplying a predetermined first current command and a predetermined first angle command to said current regulator for a first parking time, to move said rotor from said arbitrary initial position to an intermediate position; and
   supplying a second current command and a second angle command to said current regulator for a second parking time, to move said rotor to said predetermined final position.

2. A method of controlling a motor-control current regulator to park a motor rotor in a predetermined position as claimed in claim 1, wherein said current regulator has a normal voltage output range; and
   further comprising the step of limiting a voltage output of said current regulator to a reduced voltage output range for at least a portion of said parking time.

3. A method as claimed in claim 1, wherein said motor is a permanent-magnet synchronous motor with sinusoidal back-EMF.

4. A system for moving a rotor of a motor from an arbitrary initial position in which rotor flux is 180 degrees out of phase with applied current, to park said rotor in a predetermined final position, comprising:
   a current regulator motor control;
   a first circuit for supplying a predetermined first current command and a predetermined first angle command for a first parking time to said current regulator, to move said rotor from said arbitrary initial position to an intermediate position; and
   a second circuit for supplying a second current command and a second angle command for a second parking time to said current regulator, to move said rotor to said predetermined final position.

5. A system for parking a rotor of a motor as claimed in claim 4, wherein said current regulator has a normal voltage output range; and
   a third circuit for limiting a voltage output of said current regulator to a reduced voltage output range for at least a portion of said parking time.

6. A system as claimed in claim 4, wherein said motor is a permanent-magnet synchronous motor with sinusoidal back-EMF.

* * * * *